US010063457B2

(12) United States Patent
Haas (10) Patent No.: US 10,063,457 B2
(45) Date of Patent: Aug. 28, 2018

(54) METHOD, SYSTEM, AND APPARATUS FOR IMPROVING FORWARDING CAPABILITIES DURING ROUTE CONVERGENCE

(71) Applicant: Juniper Networks, Inc., Sunnyvale, CA (US)

(72) Inventor: Jeffrey M. Haas, Ypsilanti, MI (US)

(73) Assignee: Juniper Networks, Inc., Sunnyvale, CA (US)

( * ) Notice: Subject to any disclaimer, the term of this patent is extended or adjusted under 35 U.S.C. 154(b) by 186 days.

(21) Appl. No.: 15/083,359

(22) Filed: Mar. 29, 2016

(65) Prior Publication Data

US 2017/0289013 A1    Oct. 5, 2017

(51) Int. Cl.
*H04L 12/751* (2013.01)
*H04L 12/755* (2013.01)

(52) U.S. Cl.
CPC ............ *H04L 45/02* (2013.01); *H04L 45/021* (2013.01)

(58) Field of Classification Search
CPC ....................................................... H04L 45/02
See application file for complete search history.

(56) References Cited

U.S. PATENT DOCUMENTS

| | | | | |
|---|---|---|---|---|
| 5,687,167 A * | 11/1997 | Bertin | ................. | H04L 12/5602 370/254 |
| 6,654,346 B1 * | 11/2003 | Mahalingaiah | ......... | H04L 45/04 370/235 |
| 7,215,637 B1 * | 5/2007 | Ferguson | ................ | H04L 45/00 370/230.1 |
| 7,606,160 B2 * | 10/2009 | Klinker | ................... | H04L 29/06 370/238 |
| 7,751,331 B1 * | 7/2010 | Blair | ....................... | H04L 45/00 370/236 |

(Continued)

OTHER PUBLICATIONS

Vijay Kumar Adhikari et al., YouTube Traffic Dynamics and Its Interplay with a Tier-1 ISP: An ISP Perspective, http://www-users.cs.umn.edu/~viadhi/resources/youtube.pdf, IMC'10, (Nov. 1-3, 2010).

(Continued)

*Primary Examiner* — Andrew Lai
*Assistant Examiner* — Andrew C Lee
(74) *Attorney, Agent, or Firm* — FisherBroyles, LLP (57) ABSTRACT

The disclosed computer-implemented method for improving forwarding capabilities during route convergence may include (1) identifying, at an upstream network device, a set of updated routes that define network paths that have each experienced at least one topology change since the upstream network device last converged with a downstream network device, (2) determining, at the upstream network device, levels of priority for the set of updated routes based at least in part on amounts of traffic that traverse the network paths defined by the set of updated routes, (3) arranging, at the upstream network device, the set of updated routes in a prioritized order in accordance with the levels of priority, and then (4) converging the upstream network device with the downstream network device by sending the set of updated routes in the prioritized order to the downstream network device. Various other methods, systems, and apparatuses are also disclosed.

18 Claims, 6 Drawing Sheets

(56) References Cited

U.S. PATENT DOCUMENTS

| | | | | |
|---|---|---|---|---|
| 8,107,379 | B2* | 1/2012 | Vasseur | H04L 45/04 370/238 |
| 8,327,002 | B1* | 12/2012 | Van Dussen | H04L 65/1069 370/242 |
| 8,737,406 | B1 | 5/2014 | Cavanaugh et al. | |
| 8,824,274 | B1* | 9/2014 | Medved | H04L 45/02 370/217 |
| 9,350,661 | B2* | 5/2016 | Murphy | H04L 47/12 |
| 9,450,817 | B1* | 9/2016 | Bahadur | H04L 45/64 |
| 9,742,626 | B2* | 8/2017 | Ramachandran | H04L 41/0668 |
| 2003/0103450 | A1* | 6/2003 | Chapman | H04L 41/0896 370/229 |
| 2004/0073640 | A1* | 4/2004 | Martin | H04L 29/12066 709/223 |
| 2005/0201302 | A1* | 9/2005 | Gaddis | H04L 45/02 370/254 |
| 2006/0291446 | A1* | 12/2006 | Caldwell | H04L 45/04 370/351 |
| 2008/0151767 | A1* | 6/2008 | Moran | H04L 41/0253 370/252 |
| 2009/0109852 | A1 | 4/2009 | Grover et al. | |
| 2011/0296051 | A1* | 12/2011 | Vange | H04L 41/12 709/238 |
| 2012/0170575 | A1* | 7/2012 | Mehra | H04L 41/00 370/359 |
| 2013/0128738 | A1* | 5/2013 | Cohen | H04L 45/125 370/235 |
| 2013/0265881 | A1* | 10/2013 | Filsfils | H04L 43/04 370/241 |
| 2013/0265894 | A1* | 10/2013 | Filsfils | H04L 43/04 370/252 |
| 2015/0263952 | A1* | 9/2015 | Ganichev | H04L 45/745 370/389 |
| 2015/0271103 | A1* | 9/2015 | Thayalan | H04L 49/25 370/217 |
| 2016/0226762 | A1* | 8/2016 | Zhang | H04L 49/25 |
| 2016/0277959 | A1* | 9/2016 | Venkataraman | H04L 45/125 |
| 2017/0104676 | A1* | 4/2017 | Patel | H04L 45/70 |

OTHER PUBLICATIONS

Ronald Bonica, et al; Method, System, and Apparatus for Forwarding Network Traffic Using Minimal Forwarding Information Bases; U.S. Appl. No. 15/078,111, filed Mar. 23, 2016.

Rekhter, Y. et al.; "A Border Gateway Protocol 4 (BGP-4);" Network Working Group RFC 1717, Internet Society (ISOC) 4, Rue Des falasises, CH-1205 Geneva, Switzerland, CH; Jan. 1, 2006.

* cited by examiner

Queue
220

First Out: 64.15.1112.0/20, 208.65.152.0/22, 208.117.224.0/19, 128.47.209.0/18, ... Last Out: 82.92.156.0/16

METHOD, SYSTEM, AND APPARATUS FOR IMPROVING FORWARDING CAPABILITIES DURING ROUTE CONVERGENCE

BACKGROUND

Networks often experience topology changes that necessitate route updates. For example, an administrator may add a router to a network and/or remove a router from the network. Additionally or alternatively, a physical link in the network may suffer a failure that prevents the flow of network traffic via certain paths. As a result, the routers within the network may need to modify routes affected by topology changes within their routing tables and/or forwarding tables. To facilitate modifying the affected routes in this way, the routers may converge with one another by advertising updates to the affected routes.

In this context, the term "convergence" may refer to the process of updating affected routes to account for topology changes within a network. Traditional routers may advertise updates to the affected routes by sending the updates to one another. Some of the affected routes may be more important than others. For example, one of the affected routes may carry a lot of traffic, but another one of the affected routes may carry practically no traffic at all.

Unfortunately, these traditional routers may be unable to forward traffic via the affected routes until the updates have been installed into the routers' routing and forwarding tables. Moreover, the order in which these updates are sent by the traditional routers may have little, if any, meaning or purpose. Since the updates are sent in no particular order during convergence, these traditional routers may end up installing updates to very important routes (e.g., high-traffic routes) after a long queue of updates to unimportant routes (e.g., low-traffic routes). As a result, the traditional routers may be unable to forward traffic via the very important routes until after the updates to the unimportant routes have been installed, thereby potentially causing delays and/or disruptions in the routers' forwarding capabilities.

The instant disclosure, therefore, identifies and addresses a need for additional and improved methods, systems, and apparatuses for improving forwarding capabilities during route convergence.

SUMMARY

As will be described in greater detail below, the instant disclosure generally relates to methods, systems, and apparatuses for improving forwarding capabilities during route convergence. In one example, a method for accomplishing such a task may include (1) identifying, at an upstream network device, a set of updated routes that define network paths that have each experienced at least one topology change since the upstream network device last converged with a downstream network device, (2) determining, at the upstream network device, levels of priority for the set of updated routes based at least in part on amounts of traffic that traverse the network paths defined by the set of updated routes, (3) arranging, at the upstream network device, the set of updated routes in a prioritized order in accordance with the levels of priority determined based at least in part on the amounts of traffic that traverse the network paths, and (4) converging the upstream network device with the downstream network device by sending the set of updated routes in the prioritized order to the downstream network device such that the downstream network device is able to forward traffic by way of higher priority routes within the set of updated routes before lower priority routes within the set of updated routes.

Similarly, a system for implementing the above-described method may include (1) an identification module, stored in memory, that identifies, at an upstream network device, a set of updated routes that define network paths that have each experienced at least one topology change since the upstream network device last converged with a downstream network device, (2) a prioritization module, stored in memory, that determines, at the upstream network device, levels of priority for the set of updated routes based at least in part on amounts of traffic that traverse the network paths defined by the set of updated routes, (3) a sorting module, stored in memory, that arranges, at the upstream network device, the set of updated routes in a prioritized order in accordance with the levels of priority determined based at least in part on the amounts of traffic that traverse the network paths, (4) a convergence module, stored in memory, that converges the upstream network device with the downstream network device by sending the set of updated routes in the prioritized order to the downstream network device such that the downstream network device is able to forward traffic by way of higher priority routes within the set of updated routes before lower priority routes within the set of updated routes, and (5) at least one physical processor configured to execute the identification module, the determination module, the sorting module, and the convergence module.

An apparatus for implementing the above-described method may include (1) a memory device that stores a set of updated routes that define network paths that have each experienced at least one topology change since the upstream network device last converged with a downstream network device and (2) a processing unit communicatively coupled to the memory device, wherein the processing unit (A) determines, at the upstream network device, levels of priority for the set of updated routes based at least in part on amounts of traffic that traverse the network paths defined by the set of updated routes, (B) arranges, at the upstream network device, the set of updated routes in a prioritized order in accordance with the levels of priority determined based at least in part on the amounts of traffic that traverse the network paths, and (C) converges the upstream network device with the downstream network device by sending the set of updated routes in the prioritized order to the downstream network device such that the downstream network device is able to forward traffic by way of higher priority routes within the set of updated routes before lower priority routes within the set of updated routes.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various methods, systems, and apparatuses for improving forwarding capabilities during route convergence. As will be explained in greater detail below, embodiments of the instant disclosure may enable routers to receive advertised updates to routes affected by topology changes in a prioritized order. As a result, embodiments of the instant disclosure may enable these routers to install updates to important routes before updates to unimportant routes during convergence. By installing updates to important routes before updates to unimportant routes in this way, embodiments of the instant disclosure may enable these routers to forward traffic by way of the important routes at an earlier point in the convergence process. In other words, embodiments of the instant disclosure may ensure that the important routes are not only able to carry traffic prior to completion of the convergence process but also able to carry traffic sooner than the unimportant routes during convergence.

The term "convergence" and the phrase "to converge," as used herein, generally refer to the process of updating routes affected by topology changes within a network. In this context, a set of network devices may fully converge once they have completed exchanging any updates to routes affected by topology changes such that the devices' routing tables include the same routes or at least non-contradictory routes. In other words, convergence may reach a state of completion when the network devices effectively agree, by way of their routing tables, on the current network topology. Accordingly, the routing tables of these converged network devices may include only routes that are consistent with one another.

Figure 1:
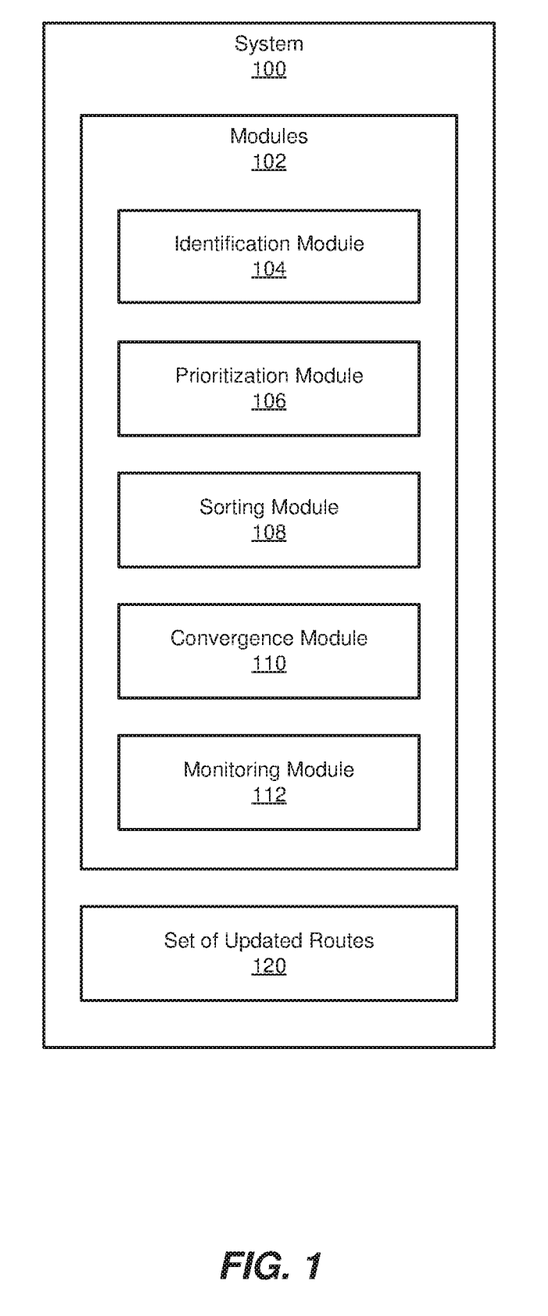
FIG. 1 is a block diagram of an exemplary system for improving forwarding capabilities during route convergence.
Figure 2:
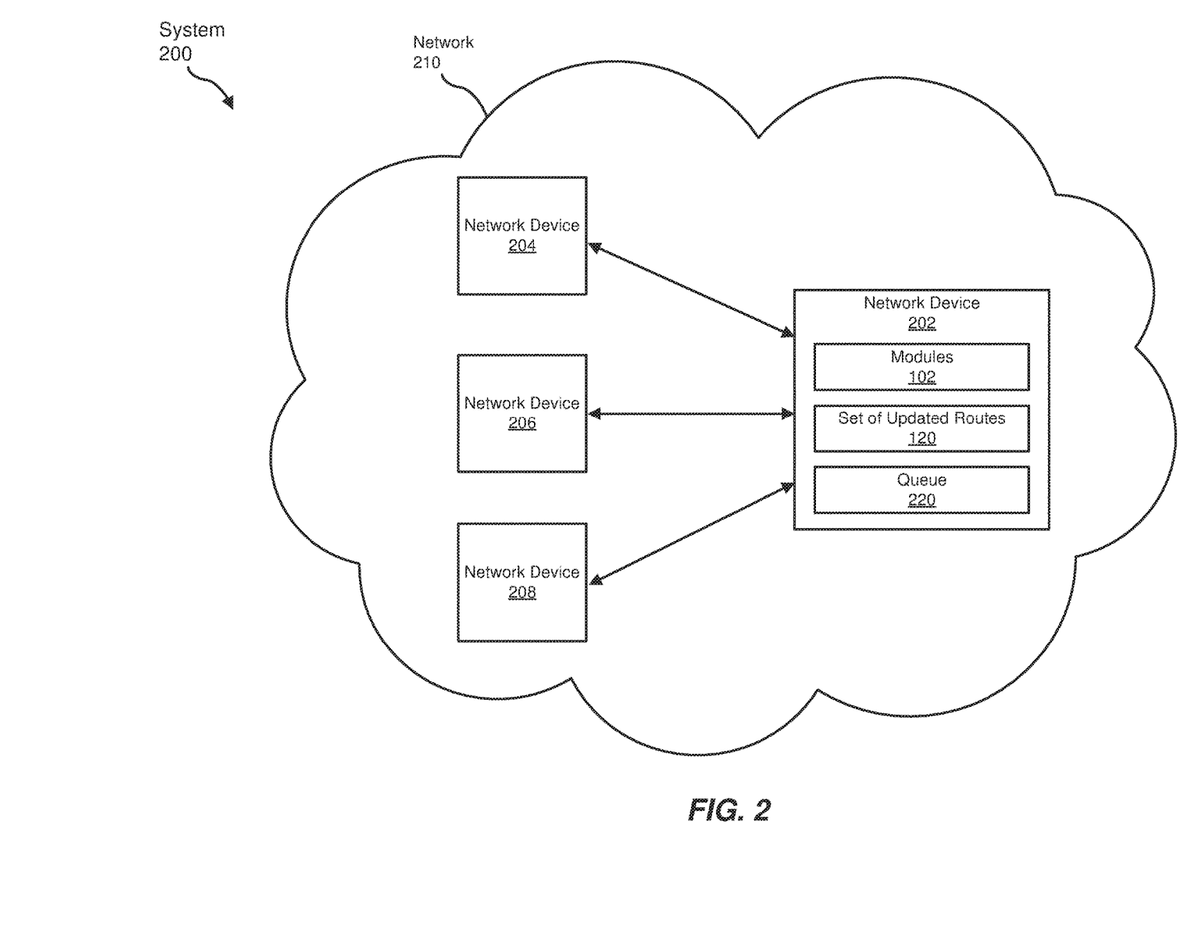
FIG. 2 is a block diagram of an exemplary system for improving forwarding capabilities during route convergence.

The following will provide, with reference to FIGS. 1 and 2, detailed descriptions of exemplary systems for improving forwarding capabilities during route convergence. Detailed descriptions of corresponding computer-implemented methods will be provided in connection with FIG. 3. Detailed descriptions of an exemplary traffic-based ranking of updated routes will be provided in connection with FIG. 4. Detailed descriptions of an exemplary queue that includes a set of updated routes arranged in a prioritized order will be provided in connection with FIG. 5. In addition, detailed descriptions of an exemplary computing system capable of implementing one or more of the embodiments described herein will be provided in connection with FIG. 6.

FIG. 1 is a block diagram of an exemplary system 100 for improving forwarding capabilities during route convergence. As illustrated in this figure, exemplary system 100 may include one or more modules 102 for performing one or more tasks. For example, and as will be explained in greater detail below, exemplary system 100 may include an identification module 104 that identifies, at an upstream network device, a set of updated routes that define network paths that have each experienced at least one topology change since the upstream network device last converged with a downstream network device. Exemplary system 100 may also include a prioritization module 106 that determines, at the upstream network device, levels of priority for the set of updated routes based at least in part on amounts of traffic that traverse the network paths defined by the set of updated routes. Exemplary system 100 may further include a sorting module 108 that arranges, at the upstream network device, the set of updated routes in a prioritized order in accordance with the levels of priority determined based at least in part on the amounts of traffic that traverse the network paths.

In addition, and as will be described in greater detail below, exemplary system 100 may include a convergence module 110 that converges the upstream network device with the downstream network device by sending the set of updated routes in the prioritized order to the downstream network device such that the downstream network device is able to forward traffic by way of higher priority routes within the set of updated routes before lower priority routes within the set of updated routes. Moreover, exemplary system 100 may include a monitoring module 112 that monitors the amounts of traffic that traverse the network paths defined by the set of updated routes by way of a traffic flow analysis. Although illustrated as separate elements, one or more of modules 102 in FIG. 1 may represent portions of a single module or application (such as a network operating system).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as any of the devices illustrated in FIG. 2 (e.g., network devices 202, 204, 206, and/or 208), and/or computing system 600 in FIG. 6. One or more of modules 102 in FIG. 1 may also represent all or portions of one or more special-purpose computers configured to perform one or more tasks.

As illustrated in FIG. 1, system 100 may also include one or more sets of updated routes, such as set of updated routes 120. In one example, set of updated routes 120 may include and/or represent routes that define paths to destinations whether inside or outside a network. The term "path," as used herein, generally refers to any series of links and/or devices that facilitate communication and/or the flow of traffic between a source and a destination within a network and/or across networks. The term "route," as used herein, generally refers to any type or form of information, data, and/or representation that indicates and/or identifies a path within a network and/or across networks.

In one example, set of updated routes 120 may be maintained and/or stored in a routing table and/or a Routing Information Base (RIB). The routing table and/or RIB may include and/or represent any type or form of database and/or table that includes, stores, and/or identifies one or more routes within a routing engine of a router. Additionally or alternatively, set of updated routes 120 may be maintained and/or stored in a forwarding table and/or a Forwarding Information Base (FIB). The forwarding table and/or FIB may include and/or represent any type or form of database and/or table that includes, stores, and/or identifies one or more active routes within a forwarding engine (sometimes also referred to as a packet forwarding engine) of a router.

Each route may indicate and/or identify various information and/or data representative of a path. Examples of such information and/or data include, without limitation, the Internet Protocol (IP) address of the destination device, the IP address of a gateway device, a routing prefix of the destination or gateway device, the IP address of the next hop, a network mask, combinations or variations of one or more of the same, and/or any other suitable information or data.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 210 that supports and/or facilitates communication and/or data transfer among network devices 202, 204, 206, and 208 and/or various client devices (not illustrated in FIG. 2). Although FIG. 2 illustrates only network devices 202, 204, 206, and 208 within network 210, various other network devices and/or computing devices may represent part of network 210 and/or be included in network 210.

In one example, network device 202 may be programmed with one or more of modules 102. In this example, network device 202 may include, store, and/or maintain set of updated routes 120. Additionally or alternatively, network device 202 may include and/or store a queue 220 that maintains set of updated routes 120 in a prioritized order to be sent to network devices 204, 206, and/or 208 during convergence. Although not necessarily illustrated in this way in FIG. 2, network devices 204, 206, and/or 208 may also be programmed with one or more of modules 102.

In one example, one or more of modules 102 from FIG. 1 may, when executed by at least one processor of network device 202 in FIG. 2, enable network device 202 to improve forwarding capabilities during route convergence. For example, and as will be described in greater detail below, one or more of modules 102 may cause network device 202 to (1) identify, at network device 202, set of updated routes 120 that define network paths that have each experienced at least one topology change since network device 202 last converged with network devices 204, 206, and/or 208, (2) determine, at network device 202, levels of priority for set of updated routes 120 based at least in part on amounts of traffic that traverse the network paths defined by set of updated routes 120, (3) arranging, at network device 202, set of updated routes 120 in a prioritized order in accordance with the levels of priority determined based at least in part on the amounts of traffic that traverse the network paths, and then (4) converging network device 202 with network devices 204, 206, and/or 208 by sending set of updated routes 120 in the prioritized order to network devices 204, 206, and/or 208 such that network devices are able to forward traffic by way of higher priority routes within set of updated routes 120 before lower priority routes within set of updated route 120.

Network devices 202, 204, 206, and/or 208 each generally represent any type or form of device, system, and/or mechanism that facilitates communication and/or network traffic among computing devices and/or within a network or across networks. In one example, network devices 202, 204, 206, and/or 208 may each represent a router. Additionally or alternatively, network devices 202, 204, 206, and/or 208 may each include and/or represent a gateway to a network. Examples of network devices 202, 204, 206, and/or 208 include, without limitation, routers (such as provider edge routers, hub routers, spoke routers, autonomous system boundary routers, and/or area border routers), switches, hubs, modems, bridges, repeaters, gateways, multiplexers, network adapters, network interfaces, network racks, chasses, servers, computing devices, virtual machines running on one or more of the same, portions of one or more of the same, combinations or variations of one or more of the same, and/or any other suitable network devices.

Network 210 each generally represent to any type or form of medium and/or architecture that facilitates communication or data transfer. In one example, network 210 may facilitate traffic for subscribers of a service provider (such as AT&T, VERIZON WIRELESS, SPRINT, T-MOBILE, FACEBOOK, GOOGLE, INSTAGRAM, NETFLIX, AMAZON, YOUTUBE, CENTURY LINK, COMCAST, DIRECTV, and/or APPLE). Examples of network 210 include, without limitation, an MPLS network, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), a peer network, portions of one or more of the same, combinations or variations of one or more of the same, and/or any other suitable networks. Network 210 may support and/or facilitate communication or data transfer using wireless and/or wired connections. Although FIG. 2 illustrates only a single network, alternative embodiments may include various other networks in addition to network 210. Additionally or alternatively, although FIG. 2 illustrates network 210 as a single entity, network 210 may alternatively include and/or represent a plurality of networks and/or subnetworks.

Figure 3:
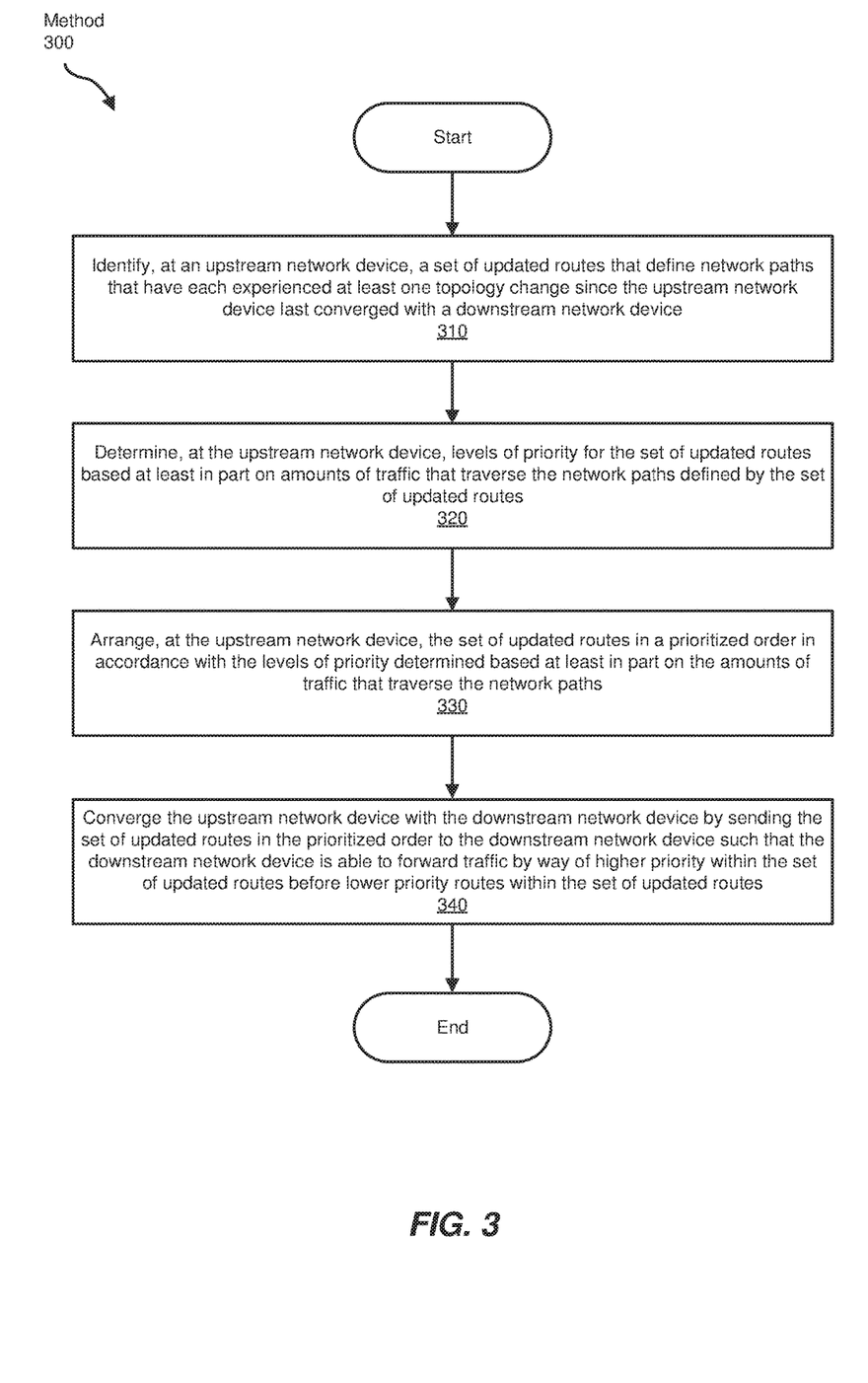
FIG. 3 is a flow diagram of an exemplary method for improving forwarding capabilities during route convergence.

FIG. 3 is a flow diagram of an exemplary computer-implemented method 300 for improving forwarding capabilities during route convergence. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or computing system 600 in FIG. 6.

As illustrated in FIG. 3, at step 310 one or more of the systems described herein may identify, at an upstream network device, a set of updated routes that define network paths that have each experienced at least one topology change since the upstream network device last converged with a downstream network device. For example, identification module 104 may, as part of network device 202 in FIG. 2, identify set of updated routes 120 that define network paths that have each experienced at least one topology change since network device 202 last converged with network device 204, 206, and/or 208. Examples of such a topology change include, without limitation, adding a network device to a network, removing a network device from a network, a failure of network device within a network, a failure of communication port, link, and/or connection within a network, combinations or variations of one or more of the same, and/or any suitable topology change.

The term "upstream network device," as used herein, generally refers to any type or form of network device that resides more toward the server-side, and/or further away from the client-side, than a certain point of reference. In contrast, the term "downstream network device," as used herein, generally refers to any type or form of network device that resides more toward the client-side, and/or further away from the server-side, than a certain point of reference.

The systems described herein may perform step 310 in a variety of ways and/or contexts. In some examples, identification module 104 may identify set of updated routes 120 based at least in part on any delays, disruptions, and/or failures detected in connection with traffic traversing network 210. For example, monitoring module 112 may, as part of network device 202 in FIG. 2 and/or another network device (not necessarily illustrated in FIG. 2), monitor traffic received and/or transmitted by network device 202 within network 210. In this example, monitoring module 112 may detect any delays, disruptions, and/or failures that occur in connection with traffic transmitted by network device 202. Identification module 104 may then determine that some of these delays, disruptions, and/or failures resulted from a change in the topology of network 210. In response to this determination, identification module 104 may identify any routes involving the portion of network 210 that experienced the topology change and/or are affected by the same.

In some examples, identification module 104 may identify set of updated routes 120 based at least in part on a notification and/or advertisement indicating a change in the topology of network 210. For example, identification module 104 may receive a notification and/or advertisement indicating that a network device has been added to network 210. In one example, the notification and/or advertisement may be initiated by the newly added network device itself. In another example, the notification and/or advertisement may be initiated by a computing device operated by a network administrator involved in adding the network device to network 210. In response to the notification and/or advertisement, identification module 104 may identify any routes that are affected by the addition of the network device.

Additionally or alternatively, identification module 104 may receive a notification and/or advertisement indicating that a network device has been removed from network 210. In one example, the notification and/or advertisement may be initiated by another network device that detected the removal of the network device from network 210. In another example, the notification and/or advertisement may be initiated by a computing device operated by a network administrator involved in removing the network device from network 210. In response to the notification and/or advertisement, identification module 104 may identify any routes that are affected by the removal of the network device.

As another example, identification module 104 may receive a notification and/or advertisement indicating that certain traffic was dropped and/or unable to reach its destination due at least in part to a failure. Identification module 104 may then determine that the notification and/or advertisement resulted from a change in the topology of network 210. In response to this determination, identification module 104 may identify any routes involving the portion of network 210 that experienced the topology change and/or are affected by the same.

Upon identification of the routes that define network paths affected by the topology change, network device 202 may modify and/or update those routes to account for the topology change. For example, network device 202 may modify and/or update the affected routes such that they define network paths that lead to the correct destination and/or are able to reach the same. In this example, these modified routes may constitute and/or represent alternatives to those routes that defined network paths that were affected by the topology change.

In one example, the change to the topology of network 210 may have occurred since the last time that network device 202 converged with network device 204, 206, and/or 208. For example, the addition or removal of a network device may have occurred after the last time that network device 202 converged with network device 204, 206, and/or 208. Additionally or alternatively, the failure of a network device may have occurred after the last time that network device 202 converged with network device 204, 206, and/or 208. As a result, network device 202 may need to converge with network device 204, 206, and/or 208 again to ensure that they effectively agree, by way of their routing tables, on the current network topology.

Returning to FIG. 3, at step 320 one or more of the systems described herein may determine, at the upstream network device, levels of priority for the set of updated routes based at least in part on amounts of traffic that traverse the network paths defined by the set of updated routes. For example, prioritization module 106 may, as part of network device 202 in FIG. 2, determine levels of priority for set of updated routes 120 based at least in part on amounts of traffic that traverse the network paths defined by set of updated routes 120. In one example, the levels of priority may be relative in nature (e.g., prioritization of one route relative to another). Additionally or alternatively, the levels of priority may indicate that the routes belong to a certain class (e.g., high priority, moderate priority, and/or low priority).

The systems described herein may perform step 320 in a variety of ways and/or contexts. In some examples, prioritization module 106 may determine the levels of priority for set of updated routes 120 based at least in part on a traffic flow analysis. For example, monitoring module 112 may monitor the amounts of traffic that traverse the network paths defined by set of updated routes 120. In this example, identification module 104 may determine which updated route defines the network path that carries the most traffic. Prioritization module 106 may then determine that this high-traffic updated route has the highest priority. Additionally or alternatively, prioritization module 106 may assign this high-traffic updated route the highest priority.

Similarly, identification module 104 may determine which updated route defines the network path that carries the least traffic. Prioritization module 106 may then determine that this low-traffic updated route has the lowest priority. Additionally or alternatively, prioritization module 106 may assign this low-traffic updated route the lowest priority.

In one example, prioritization module 106 may rank set of updated routes 120 from highest priority to lowest priority. For example, prioritization module 106 may apply and/or assign the highest priority level to the updated route that carries the most traffic among set of updated routes 120. In this example, prioritization module 106 may apply and/or assign the second highest priority level to the updated route that carries the second most traffic among set of updated routes 120. Additionally or alternatively, prioritization module 106 may apply and/or assign the third highest priority level to the updated route that carries the third most traffic among set of updated routes 120.

Continuing with this example, prioritization module 106 may apply and/or assign the lowest priority level to the updated route that carries the least traffic among set of updated routes 120. In this example, prioritization module 106 may apply and/or assign the second lowest priority level to the updated route that carries the second lowest traffic among set of updated routes 120. Prioritization module 106 may continue applying and/or assigning priority levels in this way for all of updated routes 120, thereby effectively ranking set of updated routes 120 from highest priority to lowest priority.

Figure 4:
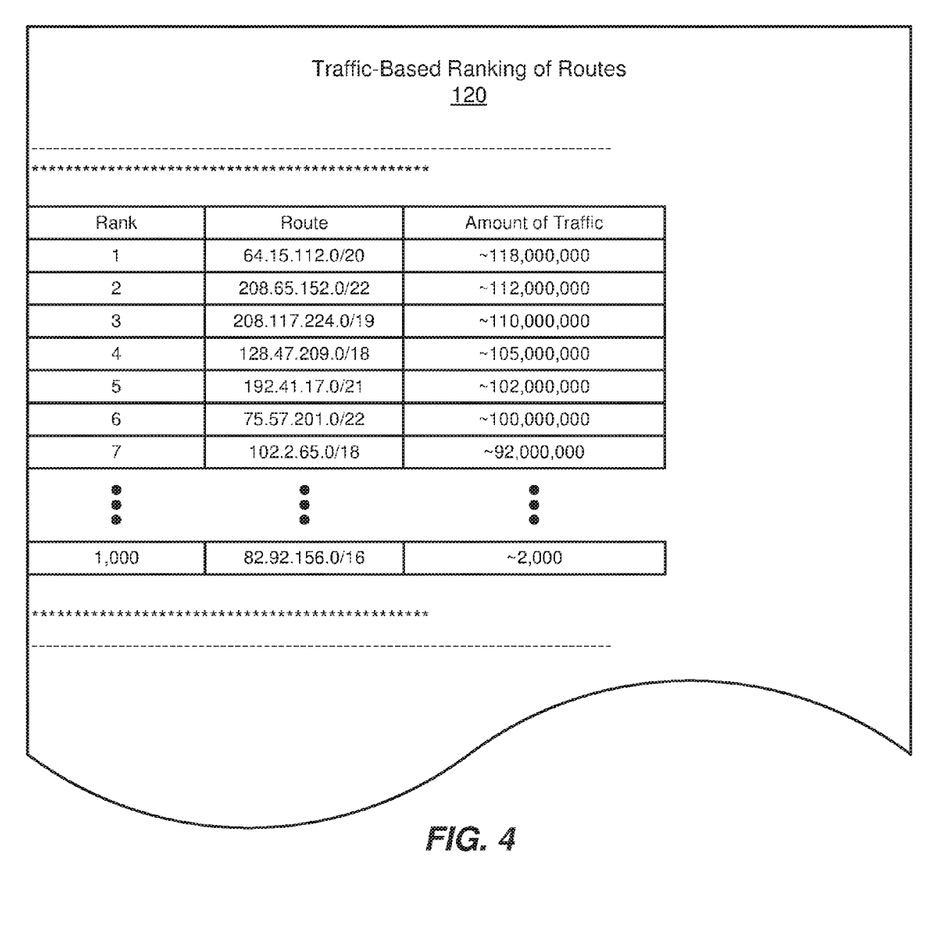
FIG. 4 is an illustration of an exemplary traffic-based ranking of updated routes.

FIG. 4 illustrates an exemplary traffic-based ranking of updated routes 120. As illustrated in FIG. 4, traffic-based ranking of updated routes 120 may identify updated routes (represented, in this example, by prefixes "64.15.112.0/20", "208.65.152.0/22", "208.117.224.0/19", "128.47.209.0/18", "192.41.17.0/21", "75.57.201.0/22", "102.2.65.0/18", and "82.92.156.0/16") according to their respective rankings (in this example, "1", "2", "3", "4", "5", "6", "7", and "1,000," respectively). These rankings may be based at least in part on the amount of traffic carried by the updated routes (in this example, "~118,000,000", "~112,000,000", "~110,000,000", "~105,000,000", "~102,000,000", "~100,000,000", "~92,000,000", and "~2,000," respectively). The amount of traffic may be represented and/or measured by the number of flows, the number of packets, and/or the number of bytes carried by such routes.

In one example, prioritization module 106 may assign a class designation to each of updated routes 120. For example, prioritization module 106 may assign a high-priority designation to each updated route that carries an amount of traffic that exceeds a high-traffic threshold. In this example, prioritization module 106 may assign a moderate-priority designation to each updated route that carries an amount of traffic that exceeds a moderate-traffic threshold but not the high-traffic threshold. Additionally or alternatively, prioritization module 106 may assign a low-priority designation to each updated route that carries an amount of traffic that does not reach the moderate-traffic threshold.

In some examples, prioritization module 106 may determine the levels of priority for set of updated routes 120 based at least in part on user input. In one example, identification module 104 may obtain user input that indicates a priority level selected by a network administrator for a route within set of updated routes 120. For example, identification module 104 may determine that a network administrator has entered user input indicating that a certain updated route should be assigned the highest priority regardless of the amount of traffic carried by that updated route. Prioritization module 106 may apply and/or assign the user-selected priority to the corresponding route based at least in part on the user input.

Additionally or alternatively, identification module 104 may identify a route within set of updated routes 120 that has been prioritized based at least in part on the route's status being mission-critical. For example, a route within set of updated routes 120 may have been designated as being mission-critical. In this example, prioritization module 106 may apply and/or assign a priority level to the route due at least in part to that mission-critical designation regardless of the amount of traffic carried by the route. Accordingly, the mission-critical status may effectively increase the route's priority level above other routes that carry more traffic than the mission-critical route. Examples of mission-critical routes include, without limitation, routes related to emergency services (such as law enforcement, medical emergencies, and/or "911" services), routes related to military services, routes related to public safety, combinations or variations of one or more of the same, and/or any other suitable mission-critical routes.

Returning to FIG. 3, at step 330 one or more of the systems described herein may arranging, at the upstream network device, the set of updated routes in a prioritized order in accordance with the levels of priority determined based at least in part on the amounts of traffic that traverse the network paths. For example, sorting module 108 may, as part of network device 202 in FIG. 2, arrange set of updated routes 120 in a prioritized order in accordance with the levels of priority determined based at least in part on the amounts of traffic that traverse the network paths defined by set of updated routes 120. The term "prioritized order," as used herein, generally refers to any type or form of arrangement, sequence, and/or order that reflects, follows, and/or coincides with priority levels of updated routes.

The systems described herein may perform step 330 in a variety of ways and/or contexts. In some examples, sorting module 108 may arrange set of updated routes 120 in the prioritized order by reordering set of updated routes 120. For example, set of updated routes 120 may occupy queue 220 in FIG. 2. In this example, set of updated routes 120 may originally be arranged out of order with respect to priority. Sorting module 108 may sort and/or reorder set of updated routes 120 in queue 220 according to the ranking of priority. In other words, sorting module 108 may effectively order set of updated routes 120 from highest priority to lowest priority in queue 220.

The resulting prioritized order may include the route with the highest priority in the first location and the route with the lowest priority in the last location within queue 220. This prioritized order may enable the route with the highest priority to be the first one sent by network device 202 to network device 204, 206, and/or 208 during convergence. Similarly, this prioritized order may enable the route with the second highest priority to be the second one sent by network device 202 to network device 204, 206, and/or 208 during convergence. Continuing in this way, the prioritized order may enable the route with the lowest priority to be the last one sent by network device 202 to network device 204, 206, and/or 208 during convergence.

Figure 5:
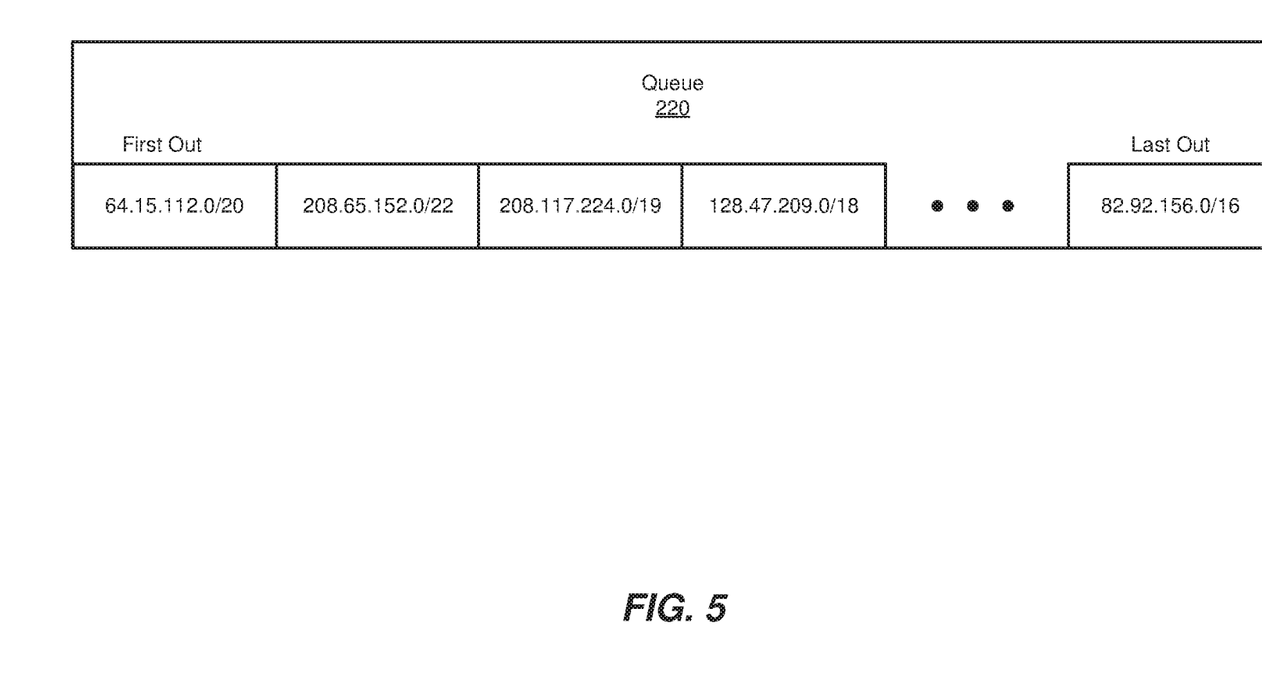
FIG. 5 is an illustration of an exemplary queue that includes a set of updated routes arranged in a prioritized order.

FIG. 5 illustrates an exemplary representation of queue 220, which includes a set of updated routes arranged in a prioritized order. As illustrated in FIG. 5, queue 220 in FIG. 5 may include a set of updated routes (represented, in this example, by prefixes "64.15.112.0/20", "208.65.152.0/22", "208.117.224.0/19", "128.47.209.0/18", and "82.92.156.0/16") arranged in order of priority. The order of updated routes included in queue 220 in FIG. 5 may correspond to and/or follow traffic-based ranking 400 in FIG. 4. In this example, the order of queue 220 in FIG. 5 may enable the "64.15.112.0/20" route to be the first one sent by network device 202 to network device 204, 206, and/or 208, the "208.65.152.0/22" route to be the second one sent by network device 202 to network device 204, 206, and/or 208, and so on.

In the event that a network administrator has provided user input specifying a certain priority level for an updated route, sorting module 108 may position that route ahead of other routes that carry more traffic due at least in part to the route's user-selected priority level. In the event that an updated route has been prioritized based at least in part on the route's mission-critical status, sorting module 108 may position that route ahead of other routes that carry more traffic due at least in part to the route's mission-critical status.

Returning to FIG. 3, at step 340 one or more of the systems described herein may converge the upstream network device with the downstream network device by sending the set of updated routes in the prioritized order to the downstream network device such that the downstream network device is able to forward traffic by way of higher priority updated routes before lower priority updates routes. For example, convergence module 110 may, as part of network device 202 in FIG. 2, direct network device 202 to converge with network device 204, 206, and/or 208. In this example, convergence module 110 may perform and/or facilitate this convergence process by sending set of updated routes 120 in the prioritized order to network device 204, 206, and/or 208. By doing so, convergence module 110 may enable network device 204, 206, and/or 208 to forward traffic by way of higher priority routes within set of updated routes 120 before lower priority routes within set of updated routes 120.

The systems described herein may perform step 340 in a variety of ways and/or contexts. In some examples, convergence module 110 may facilitate convergence among network devices 202, 204, 206, and/or 208 by way of a Border Gateway Protocol (BGP) convergence operation. For example, convergence module 110 may perform a BGP convergence operation with respect to network devices 202, 204, 206, and/or 208 by sending set of updated routes 120 from network device 202 to network device 204, 206, and/or 208 via BGP. Additionally or alternatively, convergence module 110 may send set of updated routes 120 from network device 202 to network device 204, 206, and/or 208 in the order shown in queue 220 in FIG. 2.

By sending set of updated routes 120 to network device 204, 206, and/or 208 in this order, convergence module 110 may enable network device 204, 206, and/or 208 to begin forwarding traffic to the higher priority updated routes earlier than the lower priority updated routes during the convergence process. For example, network device 204, 206, and/or 208 may be unable to forward traffic via an updated route until that updated route has been installed into the routing and forwarding tables. Since, in this example, set of updated routes 120 are sent in order of priority, network device 204, 206, and/or 208 may install updates to the important routes (e.g., high-traffic routes) sooner than the unimportant routes during the convergence process. Accordingly, convergence module 110 may enable network device 204, 206, and/or 208 not only to carry traffic prior to completion of the convergence process but also to carry traffic sooner than the unimportant routes during convergence, thereby potentially improving the forwarding capabilities of network device 204, 206, and/or 208 during route convergence.

As explained above in connection with FIGS. 1-5, routers may be able to receive advertised updates to routes affected by topology changes in a prioritized order. By receiving these updates in the prioritized order, the routers may be able to install the updates to important routes before updates to unimportant routes during convergence. Moreover, by installing the updates to important routes in this way during convergence, the routers may be able to forward traffic by way of the important routes at an earlier point in the convergence process. Accordingly, these routers may not only be able to carry traffic prior to completion of the convergence process but also be able to carry traffic sooner than the unimportant routes during convergence.

Figure 6:
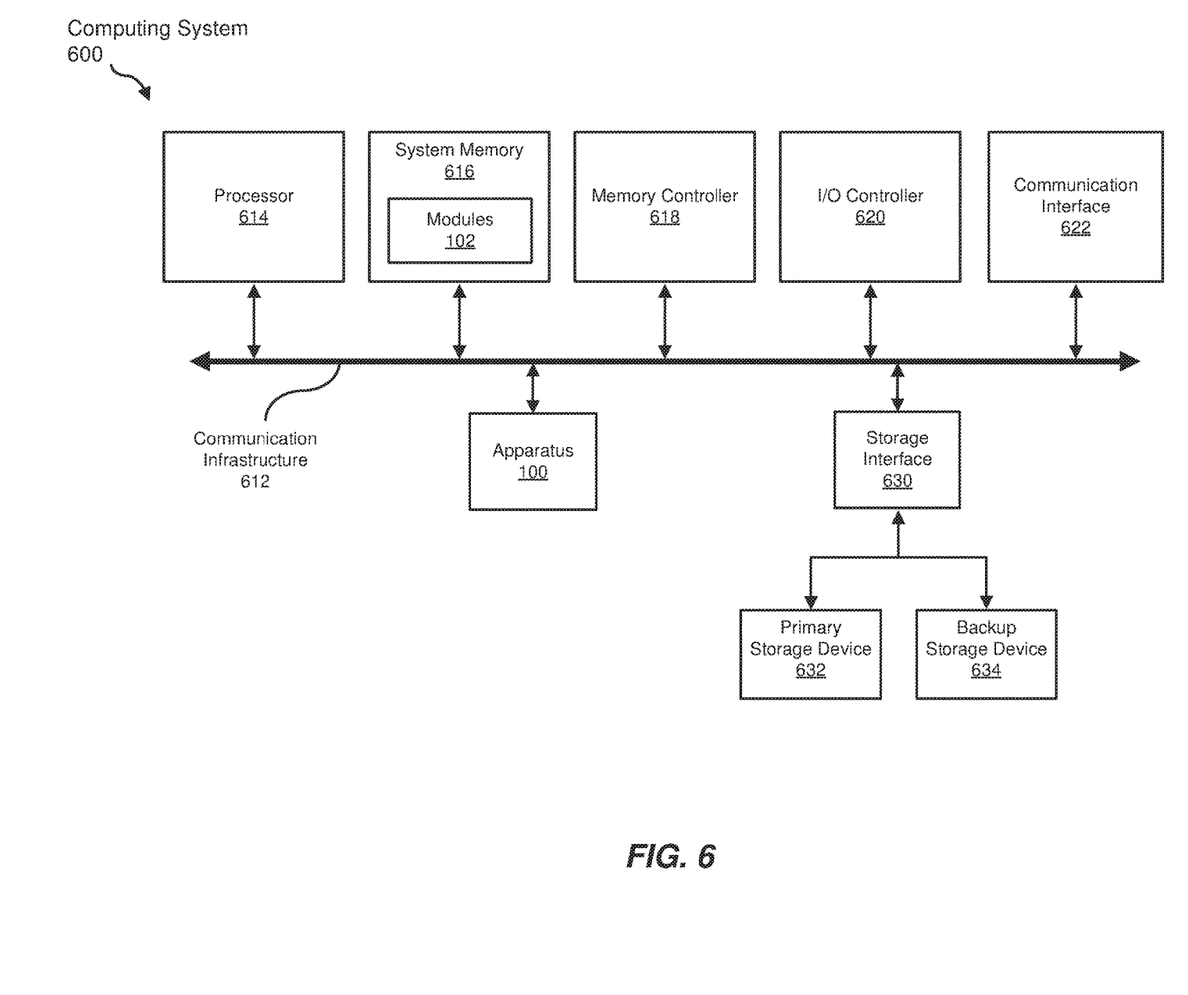
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 3. All or a portion of computing system 600 may also perform and/or be a means for performing and/or implementing any other steps, methods, or processes described and/or illustrated herein. In one example, computing system 600 may include an apparatus that performs and/or constitutes a means for performing and/or implementing any other steps, methods, or processes described and/or illustrated herein.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 600 may include both a volatile memory unit (such as, for example, system memory 616) and a non-volatile storage device (such as, for example, primary storage device 632, as described in detail below). System memory 616 may be implemented as shared memory and/or distributed memory in a network device. Furthermore, system memory 616 may store packets and/or other information used in networking operations. In one example, system memory 616 may include and/or store one or more of modules 102 from FIG. 1.

In certain embodiments, exemplary computing system 600 may also include one or more components or elements in addition to processor 614 and system memory 616. For example, as illustrated in FIG. 6, computing system 600 may include a memory controller 618, an Input/Output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, communication interface 622, and storage interface 630.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

As illustrated in FIG. 6, exemplary computing system 600 may also include a primary storage device 632 and/or a backup storage device 634 coupled to communication infrastructure 612 via a storage interface 630. Storage devices 632 and 634 generally represent any type or form of storage device or medium capable of storing data and/or other computer-readable instructions. For example, storage devices 632 and 634 may represent a magnetic disk drive (e.g., a so-called hard drive), a solid state drive, a floppy disk drive, a magnetic tape drive, an optical disk drive, a flash drive, or the like. Storage interface 630 generally represents any type or form of interface or device for transferring data between storage devices 632 and 634 and other components of computing system 600.

In certain embodiments, storage devices 632 and 634 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 634 may also include other similar structures or devices for allowing computer software, data, or other computer-readable instructions to be loaded into computing system 600. For example, storage devices 632 and 634 may be configured to read and write software, data, or other computer-readable information. Storage devices 632 and 634 may be a part of computing system 600 or may be separate devices accessed through other interface systems.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmissiontype media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   identifying, at an upstream network device, a set of updated routes that define network paths that have each experienced at least one topology change since the upstream network device last converged with a downstream network device;
   monitoring amounts of traffic that traverse the network paths defined by the set of updated routes;
   determining, at the upstream network device, levels of priority for the set of updated routes based at least in part on the amounts of traffic that traverse the network paths defined by the set of updated routes, wherein determining the levels of priority for the set of updated routes comprises:
      determining that a route carries an amount of traffic that exceeds a high-traffic threshold;
      applying a high priority level to the route due at least in part to the route carrying an amount of traffic that exceeds the high-traffic threshold;
      determining that another route carries an amount of traffic that does not reach the high-traffic threshold; and
      applying, to the another route, a priority level that is lower than the high priority level due at least in part to the another route carrying an amount of traffic that does not reach the high-traffic threshold;
   arranging, at the upstream network device, the set of updated routes in a prioritized order in accordance with the levels of priority determined based at least in part on the amounts of traffic that traverse the network paths; and
   converging the upstream network device with the downstream network device by sending the set of updated routes in the prioritized order to the downstream network device such that the downstream network device is able to forward traffic by way of higher priority routes within the set of updated routes before lower priority routes within the set of updated routes.

2. The method of claim 1, further comprising monitoring the amounts of traffic that traverse the network paths defined by the set of updated routes by way of a traffic flow analysis.

3. The method of claim 1, wherein determining the levels of priority for the set of updated routes comprises:
   determining that a first route within the set of updated routes carries an amount of traffic that exceeds an amount of traffic carried by a second route within the set of updated routes; and
   applying a higher priority level to the first route than the second route due at least in part to the first route carrying an amount of traffic that exceeds the amount of traffic carried by the second route.

4. The method of claim 1, wherein determining the levels of priority for the set of updated routes comprises:
   identifying a route within the set of updated routes that carries more traffic than any other route within the set of updated routes;
   identifying another route within the set of updated routes that carries less traffic than any other route within the set of updated routes; and
   ranking the set of updated routes from highest priority to lowest priority such that a highest priority level is applied to the route and a lowest priority level is applied to the other route.

5. The method of claim 4, wherein arranging the set of updated routes in the prioritized order comprises ordering the set of updated routes in a queue according to the ranking such that:
   the route with the highest priority level is the first route sent to the downstream network device during the convergence; and
   the other route with the lowest priority level is the last route sent to the downstream network device during the convergence.

6. The method of claim 1, wherein determining the levels of priority for the set of updated routes comprises:
   obtaining user input that indicates a user-selected priority level for at least one route within the set of updated routes; and
   applying the user-selected priority level to the route due at least in part to the user input.

7. The method of claim 1, wherein:
   determining the levels of priority for the set of updated routes comprises identifying at least one route within the set of updated routes that has been prioritized based at least in part on a mission-critical status; and
   arranging the set of updated routes in the prioritized order comprises positioning, in a queue, the route ahead of at least one other route that carries an amount of traffic that exceeds an amount of traffic carried by the route due at least in part on the route's mission-critical status.

8. The method of claim 1, wherein converging the upstream network device with the downstream network device comprises performing a Border Gateway Protocol (BGP) convergence operation with respect to the upstream network device and the downstream network device by sending the set of updated routes to the downstream network device via BGP.

9. The method of claim 1, wherein converging the upstream network device with the downstream network device comprises enabling the downstream network device to begin forwarding traffic to the higher priority routes earlier than the lower priority routes during the convergence.

10. A system comprising:
    an identification module, stored in memory, that identifies, at an upstream network device, a set of updated routes that define network paths that have each experienced at least one topology change since the upstream network device last converged with a downstream network device;
    a monitoring module, stored in memory, that monitors amounts of traffic that traverse the network paths defined by the set of updated routes;
    a prioritization module, stored in memory, that determines, at the upstream network device, levels of priority for the set of updated routes based at least in part on the amounts of traffic that traverse the network paths defined by the set of updated routes, wherein the prioritization module determines the levels of priority for the set of updated routes by:
       determining that a route carries an amount of traffic that exceeds a high-traffic threshold;
       applying a high priority level to the route due at least in part to the route carrying an amount of traffic that exceeds the high-traffic threshold;
       determining that another route carries an amount of traffic that does not reach the high-traffic threshold; and
       applying, to the another route, a priority level that is lower than the high priority level due at least in part to the another route carrying an amount of traffic that does not reach the high-traffic threshold;
    a sorting module, stored in memory, that arranges, at the upstream network device, the set of updated routes in a prioritized order in accordance with the levels of priority determined based at least in part on the amounts of traffic that traverse the network paths;
    a convergence module, stored in memory, that converges the upstream network device with the downstream network device by sending the set of updated routes in the prioritized order to the downstream network device such that the downstream network device is able to forward traffic by way of higher priority routes within the set of updated routes before lower priority routes within the set of updated routes; and
    at least one physical processor configured to execute the identification module, the monitoring module, the prioritization module, the sorting module, and the convergence module.

11. The system of claim 10, further comprising a monitoring module, stored in memory, that monitors the amounts of traffic that traverse the network paths defined by the set of updated routes by way of a traffic flow analysis; and
    wherein the physical processor is further configured to execute the monitoring module.

12. The system of claim 10, wherein the prioritization module:
    determines that a first route within the set of updated routes carries an amount of traffic that exceeds an amount of traffic carried by a second route within the set of updated routes; and
    applies a higher priority level to the first route than the second route due at least in part to the first route carrying an amount of traffic that exceeds the amount of traffic carried by the second route.

13. The system of claim 10, wherein:
    the identification module:
       identifies a route within the set of updated routes that carries more traffic than any other route within the set of updated routes; and
       identifies another route within the set of updated routes that carries less traffic than any other route within the set of updated routes; and
    the prioritization module ranks the set of updated routes from highest priority to lowest priority such that a highest priority level is applied to the route and a lowest priority level is applied to the other route.

14. The system of claim 13, wherein the sorting module orders the set of updated routes in a queue according to the ranking such that:
    the route with the highest priority level is the first route sent to the downstream network device during the convergence; and
    the other route with the lowest priority level is the last route sent to the downstream network device during the convergence.

15. The system of claim 10, wherein the prioritization module:
    obtains user input that indicates a user-selected priority level for at least one route within the set of updated routes; and
    applies the user-selected priority level to the route due at least in part to the user input.

16. The system of claim 10, wherein the prioritization module:
    determines the levels of priority for the set of updated routes comprises identifying at least one route within the set of updated routes that has been prioritized based at least in part on a mission-critical status; and arranges the set of updated routes in the prioritized order comprises positioning, in a queue, the route ahead of at least one other route that carries an amount of traffic that exceeds an amount of traffic carried by the route due at least in part on the route's mission-critical status.

17. The system of claim 10, wherein the convergence module performs a Border Gateway Protocol (BGP) convergence operation with respect to the upstream network device and the downstream network device by sending the set of updated routes to the downstream network device via BGP.

18. An apparatus comprising:
a memory device that stores a set of updated routes that define network paths that have each experienced at least one topology change since the upstream network device last converged with a downstream network device; and
a physical processor processing unit communicatively coupled to the memory device, wherein the processing unit:
monitors amounts of traffic that traverse the network paths defined by the set of updated routes;
determines, at the upstream network device, levels of priority for the set of updated routes based at least in part on the amounts of traffic that traverse the network paths defined by the set of updated routes, wherein determining the levels of priority for the set of updated routes comprises:
determining that a route carries an amount of traffic that exceeds a high-traffic threshold;
applying a high priority level to the route due at least in part to the route carrying an amount of traffic that exceeds the high-traffic threshold;
determining that another route carries an amount of traffic that does not reach the high-traffic threshold; and
applying, to the another route, a priority level that is lower than the high priority level due at least in part to the another route carrying an amount of traffic that does not reach the high-traffic threshold;
arranges, at the upstream network device, the set of updated routes in a prioritized order in accordance with the levels of priority determined based at least in part on the amounts of traffic that traverse the network paths; and
converges the upstream network device with the downstream network device by sending the set of updated routes in the prioritized order to the downstream network device such that the downstream network device is able to forward traffic by way of higher priority routes within the set of updated routes before lower priority routes within the set of updated routes.

* * * * *